US012725527B2

(12) United States Patent
Torii et al.

(10) Patent No.: US 12,725,527 B2
(45) Date of Patent: Sep. 1, 2026

(54) INFORMATION PROCESSING DEVICE, AND DISPLAY METHOD

(71) Applicant: Mitsubishi Electric Corporation, Tokyo (JP)

(72) Inventors: Akira Torii, Tokyo (JP); Jun Minagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 9 days.

(21) Appl. No.: 18/921,712

(22) Filed: Oct. 21, 2024

(65) Prior Publication Data

US 2025/0054396 A1 Feb. 13, 2025

Related U.S. Application Data

(63) Continuation of application No. PCT/JP2022/023938, filed on Jun. 15, 2022.

(51) Int. Cl.
*G08G 5/22* (2025.01)
*G08G 5/56* (2025.01)

(52) U.S. Cl.
CPC ................. *G08G 5/22* (2025.01); *G08G 5/56* (2025.01)

(58) Field of Classification Search
CPC .................................. G08G 5/22; G08G 5/56
USPC ......................................................... 340/945
See application file for complete search history.

(56) References Cited

U.S. PATENT DOCUMENTS

| | | | | |
|---|---|---|---|---|
| 5,995,078 A * | 11/1999 | Ellert | G08G 5/26 | 345/629 |
| 2005/0035898 A1 | 2/2005 | Shiomi et al. | | |
| 2014/0306950 A1* | 10/2014 | Russi | H04N 13/30 | 345/419 |

FOREIGN PATENT DOCUMENTS

| | | | |
|---|---|---|---|
| JP | 9-304526 A | | 11/1997 |
| JP | 2000-276700 A | | 10/2000 |
| JP | 2001273599 A | * | 10/2001 |
| KR | 2003-132499 A | | 5/2003 |

OTHER PUBLICATIONS

International Search Report (PCT/ISA/210) issued in PCT/JP2022/023938, dated Sep. 6, 2022.

* cited by examiner

*Primary Examiner* — Kam Wan Ma
(74) *Attorney, Agent, or Firm* — Birch, Stewart, Kolasch & Birch, LLP

(57) ABSTRACT

An information processing device includes an acquisition unit that acquires position information indicating a position of each of a plurality of aircraft, reference direction information, and direction information indicating one or more directions different from the reference direction, a generation unit that generates the plurality of aircraft as viewed from the reference direction in a three-dimensional space based on the position information and the reference direction information, an evaluation unit that evaluates an overlap level of the aircraft as viewed from the reference direction and evaluates the overlap level of the aircraft as viewed from each of one or more directions different from the reference direction based on the direction information, a detection unit that detects a direction in a case where the overlap level is lowest, and a display control unit that makes a display (Continued)

device display the plurality of aircraft as viewed from the detected direction.

5 Claims, 15 Drawing Sheets

INFORMATION PROCESSING DEVICE, AND DISPLAY METHOD

CROSS-REFERENCE TO RELATED APPLICATION

This application is a continuation application of International Application No. PCT/JP2022/023938 having an international filing date of Jun. 15, 2022.

BACKGROUND OF THE INVENTION

1. Field of the Invention

The present disclosure relates to an information processing device, and a display method.

2. Description of the Related Art

In an air terminal, an air traffic controller monitors aircraft. On a display used by the air traffic controller, the aircraft or substitutes for the aircraft are displayed. The air traffic controller is capable of grasping the position of each aircraft by viewing the display. The aircraft or the substitutes for the aircraft are displayed in two-dimensional display. Here, a technology for displaying aircraft symbols as the substitutes for the aircraft in three-dimensional display has been proposed (see Patent Reference 1). In the following description, an aircraft or the substitute for the aircraft will be referred to as an aircraft.

Patent Reference 1: Japanese Patent Application Publication No. HEI9-304526

In the above-described technology, the aircraft are displayed in three-dimensional display. There are cases where a plurality of three-dimensional aircraft overlap with each other in the air traffic controller's viewing direction. When a plurality of three-dimensional aircraft overlap with each other, recognition accuracy of the air traffic controller decreases.

SUMMARY OF THE INVENTION

An object of the present disclosure is to increase the recognition accuracy.

An information processing device according to an aspect of the present disclosure is provided. The information processing device makes a display device display information. The information processing device includes an acquisition unit that acquires position information indicating a position of each of a plurality of aircraft, reference direction information indicating a reference direction, and direction information indicating one or more directions different from the reference direction, a generation unit that generates the plurality of aircraft as viewed from the reference direction in a three-dimensional space based on the position information and the reference direction information, an evaluation unit that evaluates an overlap level of the aircraft as viewed from the reference direction and evaluates the overlap level of the aircraft as viewed from each of one or more directions different from the reference direction based on the direction information, a detection unit that detects a direction in a case where the overlap level is lowest, and a display control unit that makes the display device display the plurality of aircraft as viewed from the detected direction.

According to the present disclosure, the recognition accuracy can be increased.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein.

DETAILED DESCRIPTION OF THE INVENTION

Embodiments will be described below with reference to the drawings. The following embodiments are just examples and a variety of modifications are possible within the scope of the present disclosure.

First Embodiment

Figure 1:
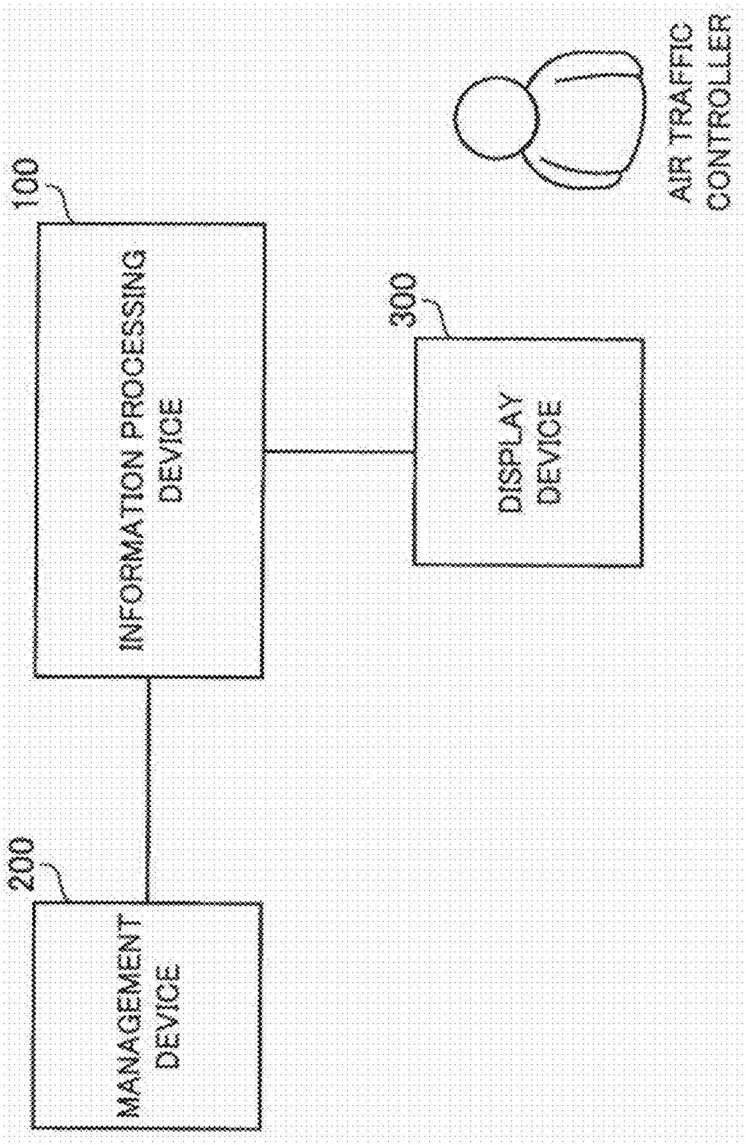
FIG. 1 is a diagram showing a communication system in a first embodiment.

FIG. 1 is a diagram showing a communication system in a first embodiment. The communication system includes an information processing device 100, a management device 200 and a display device 300. The information processing device 100, the management device 200 and the display device 300 execute communication via a network. The network is a wired network or a wireless network.

The information processing device 100 is a device that executes a display method. The information processing device 100 is a Personal Computer (PC), for example. The information processing device 100 makes the display device 300 display information.

The management device 200 stores information such as the position of each aircraft, the flight number of each aircraft, and the destination of each aircraft.

The display device 300 is a device used by an air traffic controller. It is permissible even if the display device 300 is included in the information processing device 100.

A process executed by the information processing device 100 will be described briefly below. The information processing device 100 generates a plurality of aircraft in a three-dimensional space based on the position of each of the plurality of aircraft. The information processing device 100 detects a direction in a case where an overlap level is the lowest. The information processing device 100 makes the display device 300 display the plurality of aircraft as viewed from the direction. An example of the plurality of aircraft displayed by the display device 300 will be shown below.

Figure 2:
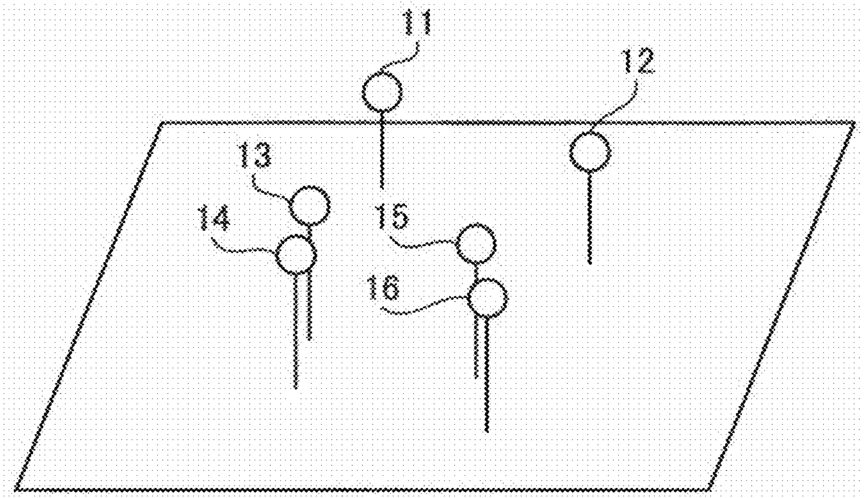
FIG. 2 is a diagram showing an example of a plurality of aircraft in the first embodiment.

FIG. 2 is a diagram showing an example of the plurality of aircraft in the first embodiment. Aircraft 11 to 16 are aircraft displayed by the display device 300. The aircraft 11 to 16 are displayed in three-dimensional display. As mentioned earlier, the aircraft 11 to 16 may be represented either by the shapes of the aircraft or by substitutes for the aircraft.

The state of the aircraft 11 to 16 is a state in which the overlap level is the lowest. Therefore, the recognition accuracy of the air traffic controller increases. Accordingly, the information processing device 100 is capable of increasing the recognition accuracy.

The information processing device 100 will be described in detail below.

First, hardware included in the information processing device 100 will be described below.

Figure 3:
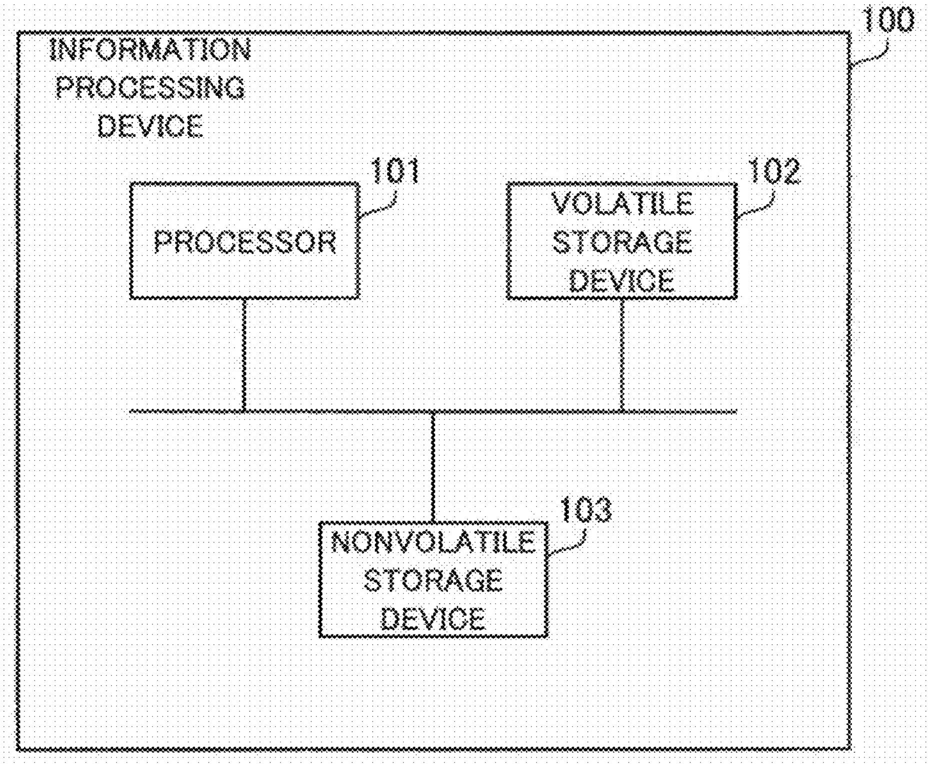
FIG. 3 is a diagram showing hardware included in an information processing device in the first embodiment.

FIG. 3 is a diagram showing the hardware included in the information processing device in the first embodiment. The information processing device 100 includes a processor 101, a volatile storage device 102 and a nonvolatile storage device 103.

The processor 101 controls the whole of the information processing device 100. The processor 101 is a Central Processing Unit (CPU), a Field Programmable Gate Array (FPGA) or the like, for example. The processor 101 can also be a multiprocessor. Further, the information processing device 100 may include processing circuitry.

The volatile storage device 102 is main storage of the information processing device 100. The volatile storage device 102 is a Random Access Memory (RAM), for example. The nonvolatile storage device 103 is auxiliary storage of the information processing device 100. The nonvolatile storage device 103 is a Hard Disk Drive (HDD) or a Solid State Drive (SSD), for example.

Next, functions of the information processing device 100 will be described below.

Figure 4:
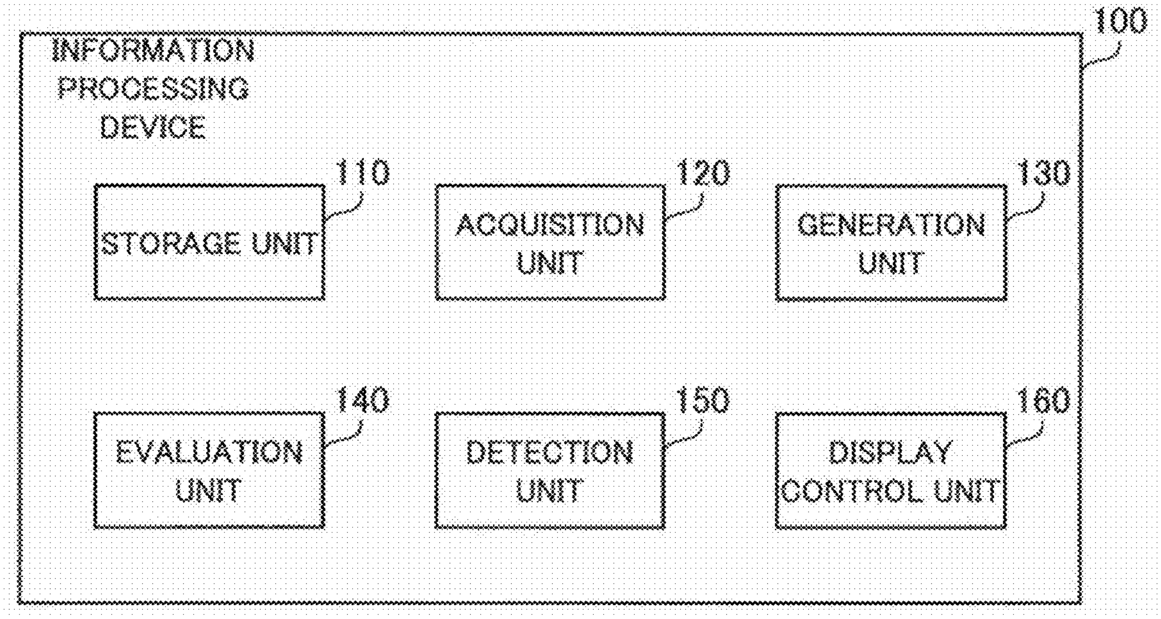
FIG. 4 is a block diagram showing functions of the information processing device in the first embodiment.

FIG. 4 is a block diagram showing the functions of the information processing device in the first embodiment. The information processing device 100 includes a storage unit 110, an acquisition unit 120, a generation unit 130, an evaluation unit 140, a detection unit 150 and a display control unit 160.

The storage unit 110 may be implemented as a storage area reserved in the volatile storage device 102 or the nonvolatile storage device 103.

Part or all of the acquisition unit 120, the generation unit 130, the evaluation unit 140, the detection unit 150 and the display control unit 160 may be implemented by processing circuitry. Further, part or all of the acquisition unit 120, the generation unit 130, the evaluation unit 140, the detection unit 150 and the display control unit 160 may be implemented as modules of a program executed by the processor 101. For example, the program executed by the processor 101 is referred to also as a display program. The display program has been recorded in a record medium, for example.

The storage unit 110 may store reference direction information indicating a reference direction and direction information indicating one or more directions different from the reference direction. Incidentally, the reference direction is, for example, a direction in which the air traffic controller normally points the line of sight. Further, the one or more directions are, for example, directions obtained by moving the reference direction horizontally and/or vertically.

The acquisition unit 120 acquires position information indicating the position of each of the plurality of aircraft from the management device 200. It is also possible for the acquisition unit 120 to acquire the position information from an external device. Incidentally, the external device is a device capable of connecting to the information processing device 100. The external device is a server, for example. Illustration of the external device is left out. Further, the position of each of the plurality of aircraft may be represented also as a present position.

The acquisition unit 120 acquires the reference direction information and the direction information from the storage unit 110 or an external device.

The generation unit 130 generates the plurality of aircraft as viewed from the reference direction in the three-dimensional space based on the position information and the reference direction information. In short, the generation unit 130 generates the plurality of aircraft as viewed from the reference direction in a three-dimensional virtual space. Accordingly, the plurality of aircraft represented three-dimensionally are generated.

The evaluation unit 140 evaluates the overlap level of the aircraft as viewed from the reference direction. Further, the evaluation unit 140 evaluates the overlap levels of the aircraft as viewed from one or more directions different from the reference direction based on the direction information.

Here, the evaluation process will be described concretely below.

Figure 5A:
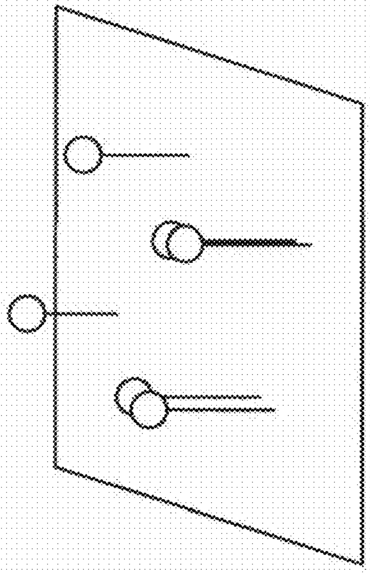
FIGS. 5(A) to 5(F) are diagrams showing a concrete example of an evaluation process in the first embodiment.
Figure 5B:
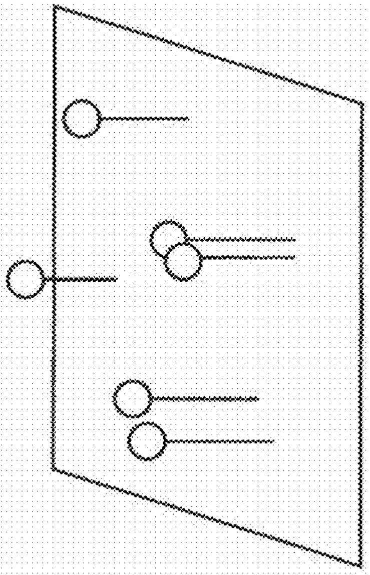
Figure 5C:
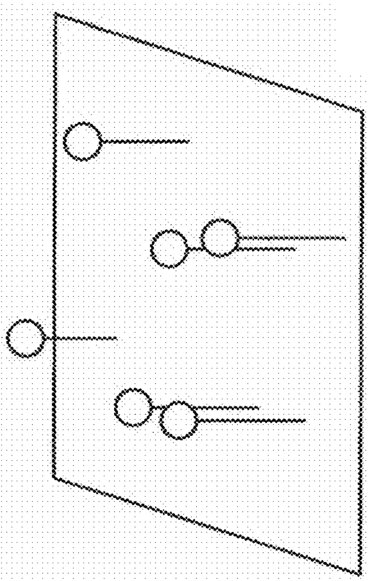
Figure 5D:
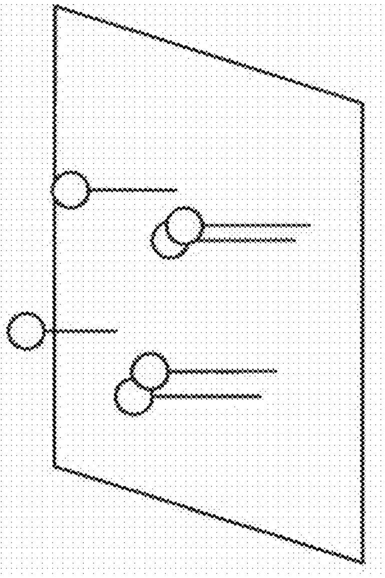
Figure 5E:
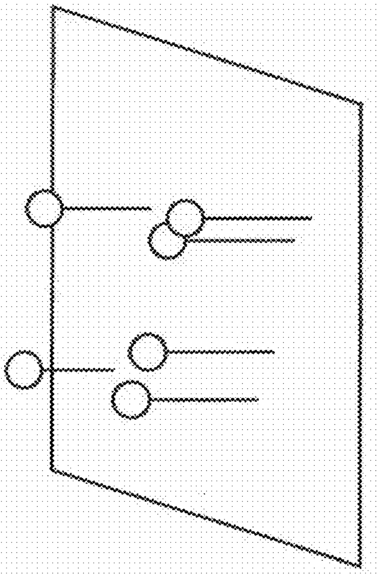
Figure 5F:
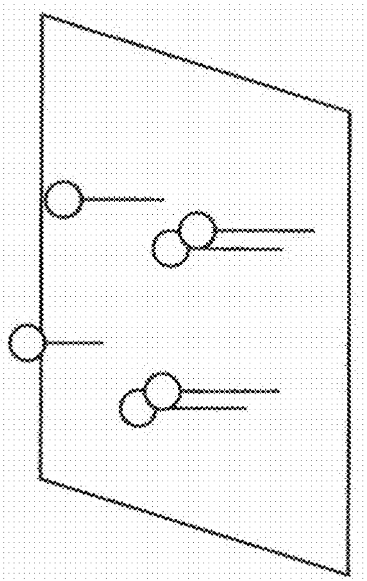

FIGS. 5(A) to 5(F) are diagrams showing a concrete example of the evaluation process in the first embodiment. FIG. 5(A) shows the plurality of aircraft as viewed from the reference direction. FIGS. 5(B) to 5(F) respectively show the plurality of aircraft as viewed from five directions different from the reference direction.

The evaluation unit 140 evaluates the overlap level based on the state of the plurality of aircraft in FIG. 5(A). The evaluation unit 140 evaluates the overlap level based on the state of the plurality of aircraft in each of FIGS. 5(B) to 5(F). As above, the evaluation unit 140 evaluates the overlap levels in six states.

The detection unit 150 detects a direction in a case where the overlap level is the lowest. Specifically, the detection unit 150 detects the direction in the case where the overlap level is the lowest among the overlap level as viewed from the reference direction and the overlap levels as viewed from the one or more directions different from the reference direction. For example, the detection unit 150 detects the direction in the state of FIG. 5(C). When there are a plurality of directions in cases where the overlap level is the lowest, the detection unit 150 may detect one of the plurality of directions closest to the reference direction.

The display control unit 160 makes the display device 300 display the plurality of aircraft as viewed from the detected direction. For example, the display control unit 160 transmits information indicating the plurality of aircraft and a display command to the display device 300. Accordingly, the display device 300 displays the plurality of three-dimensional aircraft.

Incidentally, the display control unit 160 makes the detected direction coincide with a front direction of the display device 300. This enables the air traffic controller to recognize the plurality of aircraft in the case where the overlap level is the lowest.

Next, a process executed by the information processing device 100 will be described below by using a flowchart.

Figure 6:
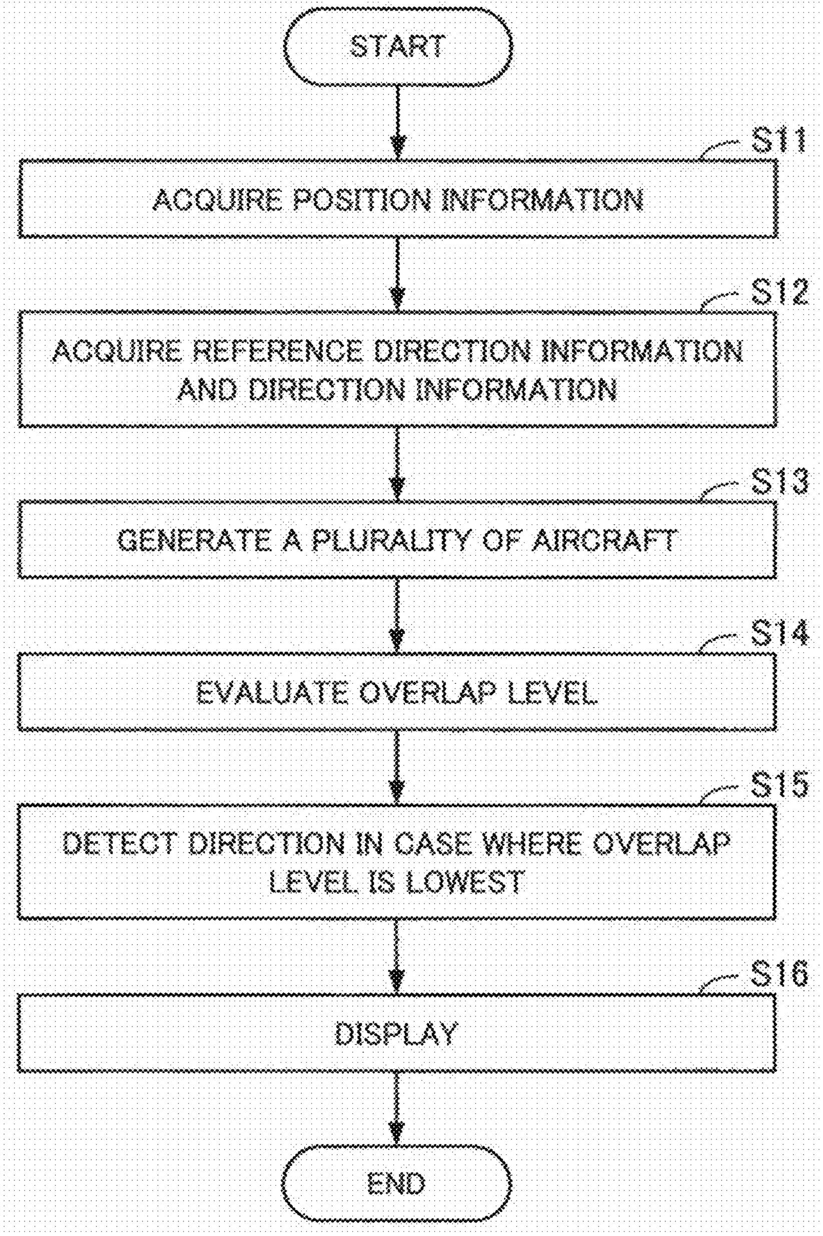
FIG. 6 is a flowchart showing an example of a process executed by the information processing device in the first embodiment.

FIG. 6 is a flowchart showing an example of the process executed by the information processing device in the first embodiment.

(Step S11) The acquisition unit 120 acquires the position information from the management device 200.

(Step S12) The acquisition unit 120 acquires the reference direction information and the direction information from the storage unit 110.

(Step S13) The generation unit 130 generates the plurality of aircraft as viewed from the reference direction based on the position information and the reference direction information.

(Step S14) The evaluation unit 140 evaluates the overlap level of the aircraft as viewed from the reference direction. Further, the evaluation unit 140 evaluates the overlap level of the aircraft as viewed from each of one or more directions different from the reference direction based on the direction information.

(Step S15) The detection unit 150 detects the direction in the case where the overlap level is the lowest.

(Step S16) The display control unit 160 makes the display device 300 display the plurality of aircraft as viewed from the detected direction.

Incidentally, processing order of the process in FIG. 6 is just an example. Thus, the process may also be executed in processing order different from that in FIG. 6.

According to the first embodiment, the information processing device 100 makes the display device 300 display the plurality of aircraft as viewed from the direction in the case where the overlap level is the lowest. Therefore, the recognition accuracy of the air traffic controller increases. Accordingly, the information processing device 100 is capable of increasing the recognition accuracy.

Second Embodiment

Next, a second embodiment will be described below. In the second embodiment, the description will be given mainly of features different from those in the first embodiment. In the second embodiment, the description is omitted for features in common with the first embodiment.

In the first embodiment, the description has given of the case where a plurality of aircraft are displayed by the display device 300. There are cases where a plurality of aircraft and a plurality of additional information are displayed by the display device 300. The additional information is the flight number, the destination, altitude, or the like, for example. In the second embodiment, a description will be given of such a case where a plurality of aircraft and a plurality of additional information are displayed.

First, an example of the case where a plurality of aircraft and a plurality of additional information are displayed by the display device 300 will be shown below.

Figure 7:
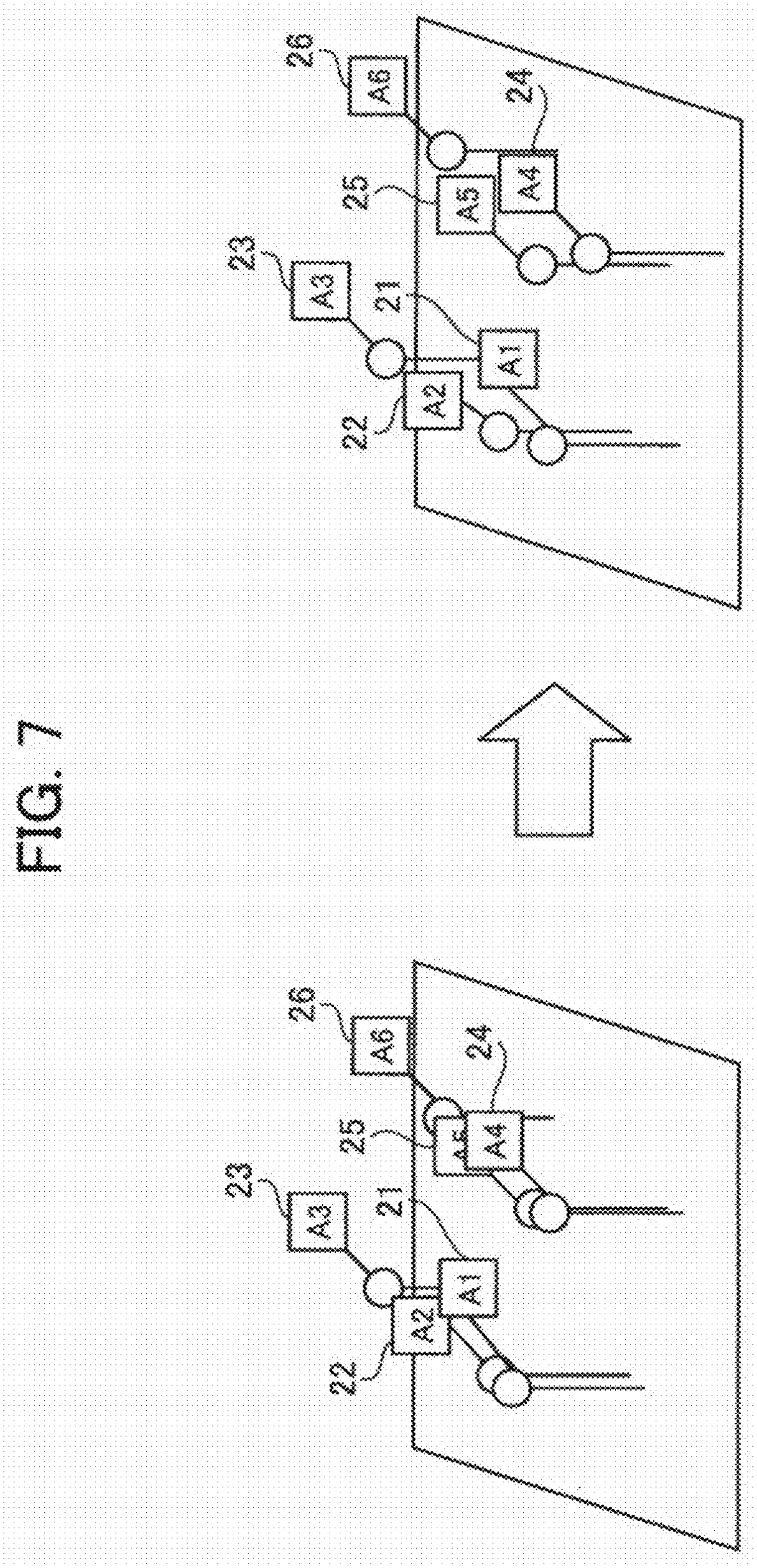
FIG. 7 is a diagram showing an example of a case where a plurality of aircraft and a plurality of additional information are displayed by a display device in a second embodiment.

FIG. 7 is a diagram showing an example of the case where a plurality of aircraft and a plurality of additional information are displayed by the display device in the second embodiment.

The left part of FIG. 7 shows a case where a plurality of aircraft and additional information 21 to 26 are displayed. Further, the left part of FIG. 7 shows a case where an aircraft and additional information overlap with each other. Furthermore, the left part of FIG. 7 shows a case where additional information and additional information overlap with other. When overlap has occurred as above, the recognition accuracy of the air traffic controller decreases. Therefore, the information processing device 100 detects the direction in the case where the overlap level is the lowest. The information processing device 100 makes the display device 300 display the plurality of aircraft and the additional information 21 to 26 as viewed from the direction.

The right part of FIG. 7 shows a state in which the plurality of aircraft and the additional information 21 to 26 are displayed by the display device 300. Thanks to such display, the recognition accuracy of the air traffic controller increases.

The process will be described in detail below.

Functional blocks included in the information processing device 100 further include functions. The added functions will be described below.

The acquisition unit 120 acquires a plurality of additional information. For example, the acquisition unit 120 acquires the plurality of additional information from the management device 200 or the external device. Incidentally, the plurality of additional information are information corresponding to the plurality of aircraft. That is, each of the plurality of additional information is information corresponding to an aircraft.

The generation unit 130 generates the plurality of aircraft and the plurality of additional information as viewed from the reference direction in the three-dimensional space based on the position information and the reference direction information.

The evaluation unit 140 evaluates the overlap level based on the plurality of aircraft and the plurality of additional information as viewed from the reference direction. The overlap level means at least one of the level of overlap between an aircraft and an aircraft, the level of overlap between additional information and additional information, and the level of overlap between an aircraft and additional information. For example, the evaluation unit 140 evaluates the sum total of the level of overlap between an aircraft and an aircraft, the level of overlap between additional information and additional information, and the level of overlap between an aircraft and additional information as the overlap level.

Further, the evaluation unit 140 evaluates the overlap level based on the plurality of aircraft and the plurality of additional information as viewed from each of one or more directions different from the reference direction. Similarly to the above-described definition, the overlap level means at least one of the level of overlap between an aircraft and an aircraft, the level of overlap between additional information and additional information, and the level of overlap between an aircraft and additional information.

The detection unit 150 detects the direction in the case where the overlap level is the lowest.

The display control unit 160 makes the display device 300 display the plurality of aircraft and the plurality of additional information as viewed from the detected direction.

Next, a process executed by the information processing device 100 will be described below by using a flowchart.

Figure 8:
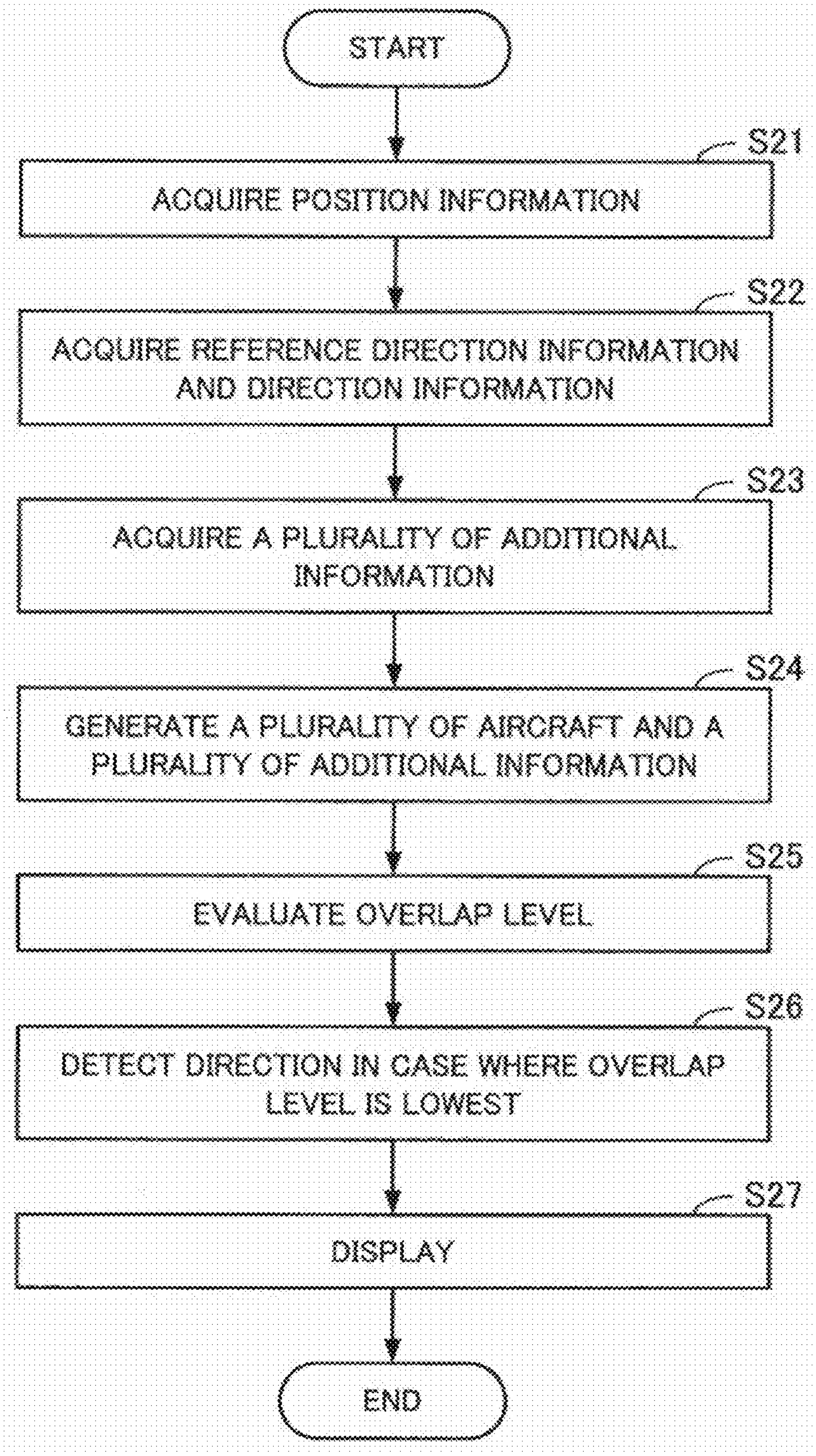
FIG. 8 is a flowchart showing an example of a process executed by an information processing device in the second embodiment.

FIG. 8 is a flowchart showing an example of the process executed by the information processing device in the second embodiment.

(Step S21) The acquisition unit 120 acquires the position information from the management device 200.

(Step S22) The acquisition unit 120 acquires the reference direction information and the direction information from the storage unit 110.

(Step S23) The acquisition unit 120 acquires the plurality of additional information from the management device 200.

(Step S24) The generation unit 130 generates the plurality of aircraft and the plurality of additional information as viewed from the reference direction based on the position information and the reference direction information.

(Step S25) The evaluation unit 140 evaluates the overlap level based on the plurality of aircraft and the plurality of additional information as viewed from the reference direction. Further, the evaluation unit 140 evaluates the overlap level as viewed from each of the one or more directions different from the reference direction based on the direction information.

(Step S26) The detection unit 150 detects the direction in the case where the overlap level is the lowest.

(Step S27) The display control unit 160 makes the display device 300 display the plurality of aircraft and the plurality of additional information as viewed from the detected direction.

Incidentally, the processing order of the process in FIG. 8 is just an example. Thus, the process may also be executed in processing order different from that in FIG. 8.

According to the second embodiment, the information processing device 100 makes the display device 300 display the plurality of aircraft and the plurality of additional information as viewed from the direction in the case where the overlap level is the lowest. Therefore, the recognition accuracy of the air traffic controller increases. Accordingly, the information processing device 100 is capable of increasing the recognition accuracy.

Third Embodiment

Next, a third embodiment will be described below. In the third embodiment, the description will be given mainly of features different from those in the first embodiment. In the third embodiment, the description is omitted for features in common with the first embodiment.

In the first embodiment, the description has given of the case where the recognition accuracy at the present time point is increased. In the third embodiment, a description will be given of a case where the recognition accuracy from the present time point to the time point N seconds is increased. Incidentally, N is a positive integer.

Figure 9:
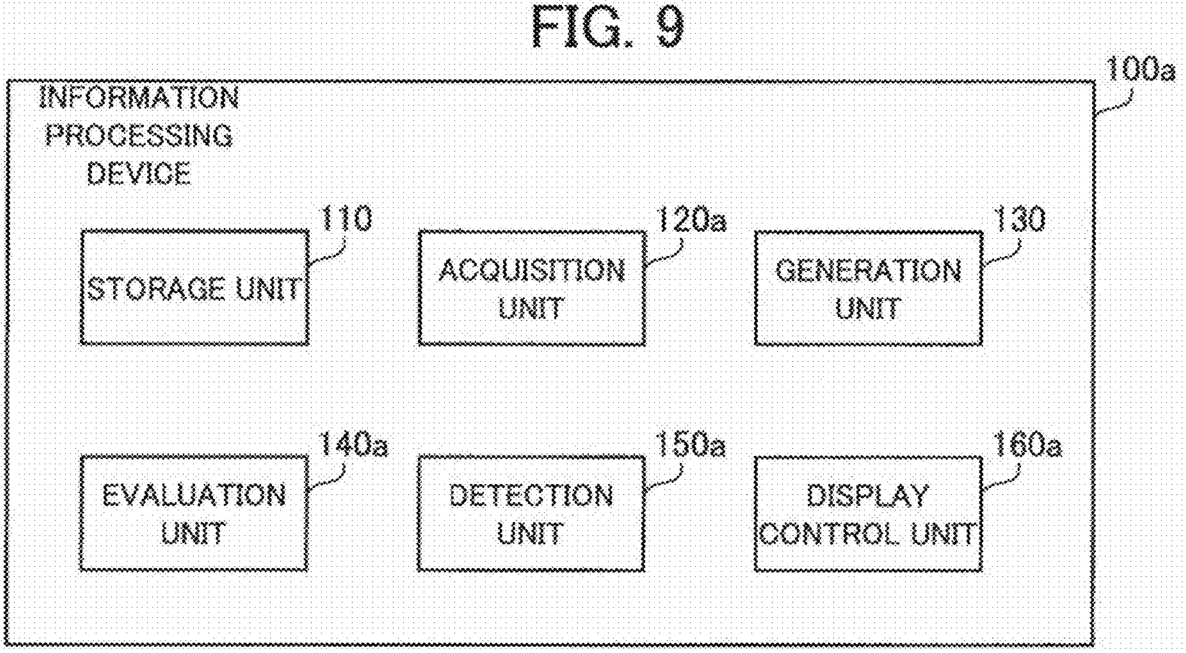
FIG. 9 is a block diagram showing functions of an information processing device in a third embodiment.

FIG. 9 is a block diagram showing functions of an information processing device in the third embodiment. Each component in FIG. 9 that is the same as a component shown in FIG. 4 is assigned the same reference character as in FIG. 4. The information processing device 100*a* includes an acquisition unit 120*a*, an evaluation unit 140*a*, a detection unit 150*a* and a display control unit 160*a*.

The acquisition unit 120*a* acquires course information, indicating a course of each of the plurality of aircraft, from the management device 200. It is also possible for the acquisition unit 120*a* to acquire the course information from the external device. Incidentally, the course may be represented also as a flight route.

The acquisition unit 120*a* acquires speed information, indicating speed of each of the plurality of aircraft, from the management device 200. It is also possible for the acquisition unit 120*a* to acquire the speed information from the storage unit 110 or the external device. Incidentally, the speed can also be a value determined based on history records.

The evaluation unit 140*a* evaluates an average value of the overlap level of the aircraft as viewed from the reference direction in a predetermined period based on the course information and the speed information as an average overlap level. In short, the evaluation unit 140*a* evaluates the average value of the overlap level when the plurality of aircraft move based on the course information and the speed information in the period as the average overlap level. For example, the evaluation unit 140*a* calculates the overlap level of the aircraft as viewed from the reference direction in a period from the present time point to N seconds later at 1-second intervals. The evaluation unit 140*a* calculates the average value of a plurality of calculated overlap levels. The evaluation unit 140*a* evaluates the calculated average value as the average overlap level.

Further, the evaluation unit 140*a* evaluates an average value of the overlap level of the aircraft as viewed from each of one or more directions different from the reference direction in the predetermined period based on the direction information, the course information and the speed information as an average overlap level. For example, the evaluation unit 140*a* calculates the overlap level of the aircraft as viewed from each of the one or more directions different from the reference direction in a period from the present time point to N seconds later at 1-second intervals. The evaluation unit 140*a* calculates the average value of a plurality of calculated overlap levels. The evaluation unit 140*a* evaluates the calculated average value as the average overlap level.

The detection unit 150*a* detects a direction in a case where the average overlap level is the lowest. Specifically, the detection unit 150*a* detects the direction in the case where the average overlap level is the lowest among the average overlap level as viewed from the reference direction and the average overlap levels as viewed from the one or more directions different from the reference direction.

The display control unit 160*a* executes control so that the plurality of aircraft as viewed from the detected direction are displayed by the display device 300 for the period.

Next, a process executed by the information processing device 100*a* will be described below by using a flowchart.

Figure 10:
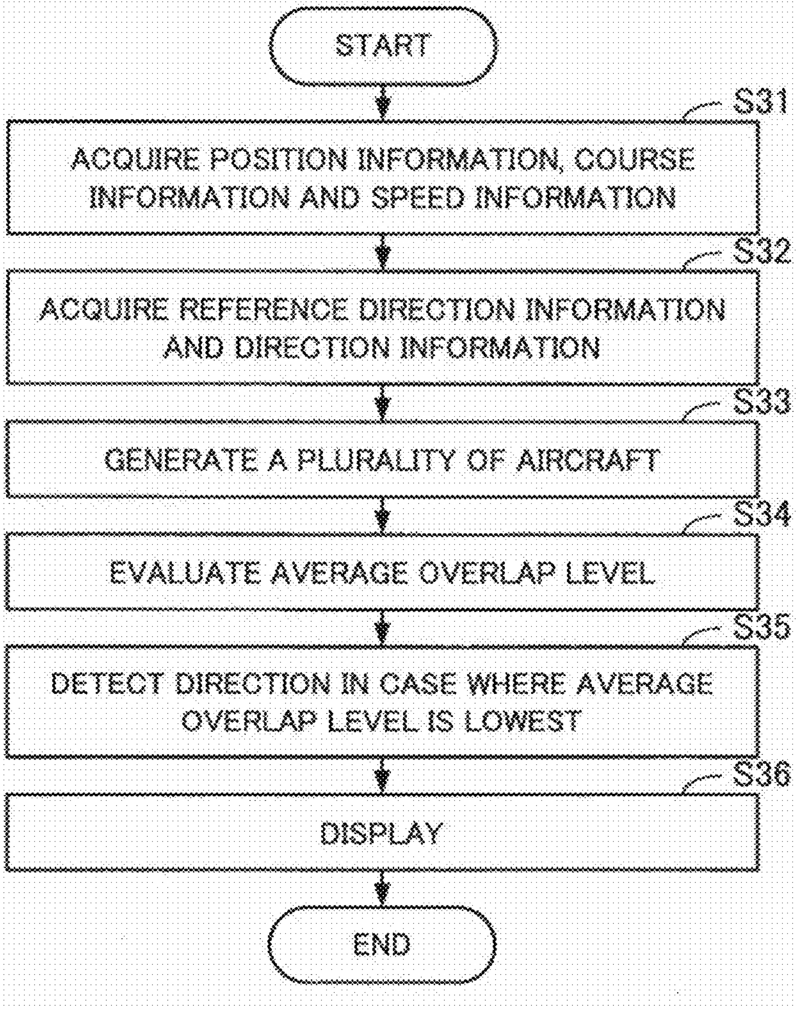
FIG. 10 is a flowchart showing an example of a process executed by the information processing device in the third embodiment.

FIG. 10 is a flowchart showing an example of the process executed by the information processing device in the third embodiment.

(Step S31) The acquisition unit 120*a* acquires the position information from the management device 200. The acquisition unit 120*a* acquires the course information from the management device 200. The acquisition unit 120*a* acquires the speed information from the management device 200.

(Step S32) The acquisition unit 120*a* acquires the reference direction information and the direction information from the storage unit 110.

(Step S33) The generation unit 130 generates the plurality of aircraft as viewed from the reference direction based on the position information and the reference direction information.

(Step S34) The evaluation unit 140*a* evaluates the average value of the overlap level of the aircraft as viewed from the reference direction in the period based on the course information and the speed information as the average overlap level. Further, the evaluation unit 140*a* evaluates the average value of the overlap level of the aircraft as viewed from each of the one or more directions different from the reference direction in the period based on the direction information, the course information and the speed information as the average overlap level.

(Step S35) The detection unit 150*a* detects the direction in the case where the average overlap level is the lowest.

(Step S36) The display control unit 160*a* makes the display device 300 display the plurality of aircraft as viewed from the detected direction. Further, the display control unit 160*a* executes the control so that the plurality of aircraft as viewed from the detected direction are displayed by the display device 300 for the period.

Incidentally, the processing order of the process in FIG. 10 is just an example. Thus, the process may also be executed in processing order different from that in FIG. 10.

According to the third embodiment, the information processing device 100*a* is capable of increasing the recognition accuracy from the present time point to the time point N seconds.

Modification of Third Embodiment

In a modification of the third embodiment, a description will be given of a case where a plurality of aircraft and a plurality of additional information are displayed by the display device 300. The modification of the third embodiment can be regarded as a combination of the second embodiment and the third embodiment.

In the modification of the third embodiment, the description will be given mainly of features different from those in the third embodiment. In the modification of the third embodiment, the description is omitted for features in common with the third embodiment.

The acquisition unit 120*a* acquires the plurality of additional information corresponding to the plurality of aircraft.

The generation unit 130 generates the plurality of aircraft and the plurality of additional information as viewed from the reference direction in the three-dimensional space based on the position information and the reference direction information.

The evaluation unit 140*a* evaluates the average value of the overlap level as viewed from the reference direction in a predetermined period based on the course information and the speed information as the average overlap level. The overlap level means at least one of the level of overlap between an aircraft and an aircraft, the level of overlap between additional information and additional information, and the level of overlap between an aircraft and additional information.

Further, the evaluation unit 140*a* evaluates the average value of the overlap level as viewed from each of one or more directions different from the reference direction in the predetermined period based on the direction information, the course information and the speed information as the average overlap level. The overlap level means at least one of the level of overlap between an aircraft and an aircraft, the level of overlap between additional information and additional information, and the level of overlap between an aircraft and additional information.

The detection unit 150*a* detects the direction in the case where the average overlap level is the lowest.

The display control unit 160*a* executes the control so that the plurality of aircraft and the plurality of additional information as viewed from the detected direction are displayed by the display device 300 for the period.

Next, a process executed by the information processing device 100*a* will be described below by using a flowchart.

Figure 11:
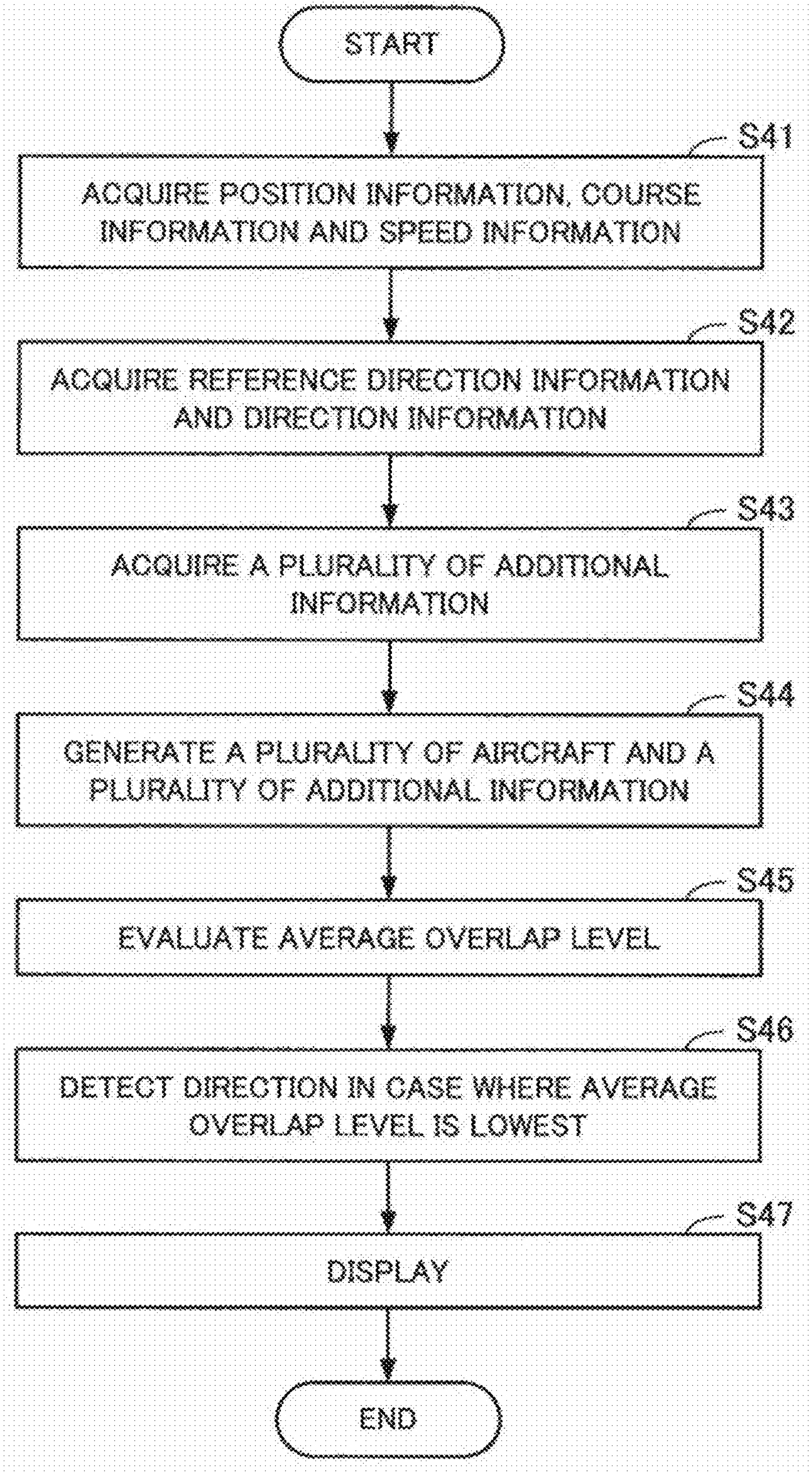
FIG. 11 is a flowchart showing an example of a process executed by an information processing device in a modification of the third embodiment.

FIG. 11 is a flowchart showing an example of the process executed by the information processing device in the modification of the third embodiment.

(Step S41) The acquisition unit 120*a* acquires the position information from the management device 200. The acquisition unit 120*a* acquires the course information from the management device 200. The acquisition unit 120*a* acquires the speed information from the management device 200.

(Step S42) The acquisition unit 120*a* acquires the reference direction information and the direction information from the storage unit 110.

(Step S43) The acquisition unit 120*a* acquires the plurality of additional information from the management device 200.

(Step S44) The generation unit 130 generates the plurality of aircraft and the plurality of additional information as viewed from the reference direction based on the position information and the reference direction information.

(Step S45) The evaluation unit 140*a* evaluates the average value of the overlap level as viewed from the reference direction in the period based on the course information and the speed information as the average overlap level. Further, the evaluation unit 140*a* evaluates the average value of the overlap level as viewed from each of one or more directions different from the reference direction in the period based on the direction information, the course information and the speed information as the average overlap level.

(Step S46) The detection unit 150*a* detects the direction in the case where the average overlap level is the lowest.

(Step S47) The display control unit 160*a* makes the display device 300 display the plurality of aircraft and the plurality of additional information as viewed from the detected direction. Further, the display control unit 160*a* executes the control so that the plurality of aircraft and the plurality of additional information as viewed from the detected direction are displayed by the display device 300 for the period.

Incidentally, the processing order of the process in FIG. 11 is just an example. Thus, the process may also be executed in processing order different from that in FIG. 11.

According to the modification of the third embodiment, the information processing device 100*a* is capable of increasing the recognition accuracy from the present time point to the time point N seconds.

Fourth Embodiment

Next, a fourth embodiment will be described below. In the fourth embodiment, the description will be given mainly of features different from those in the first embodiment. In the fourth embodiment, the description is omitted for features in common with the first embodiment.

In the fourth embodiment, a description will be given of the increase in the recognition accuracy when a plurality of aircraft represented two-dimensionally are represented three-dimensionally.

Figure 12:
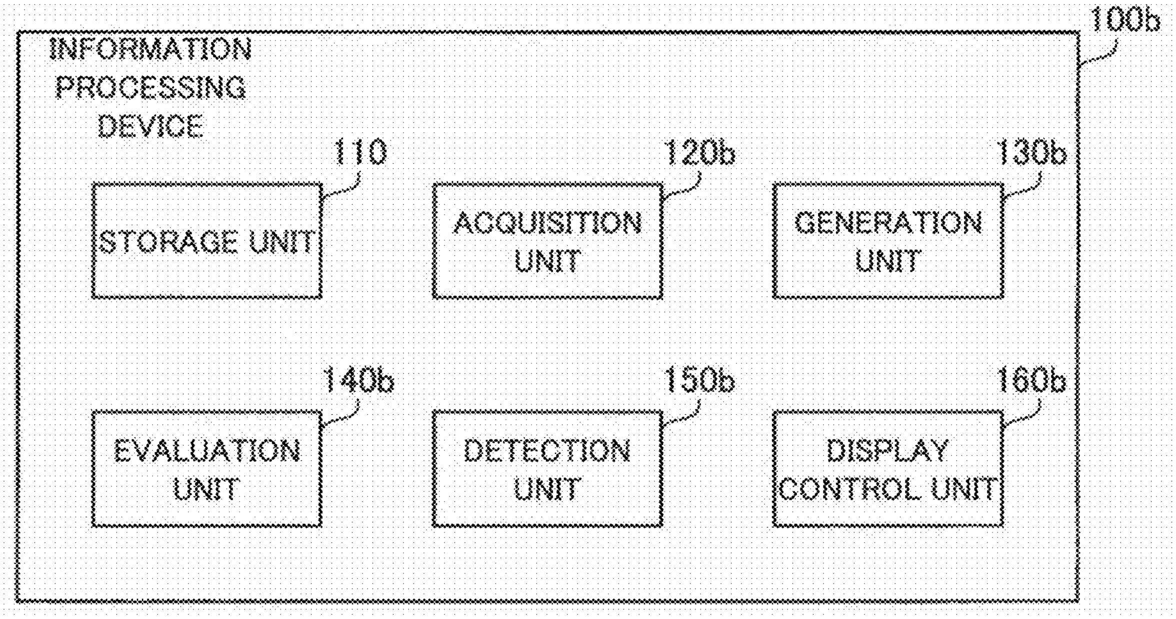
FIG. 12 is a block diagram showing functions of an information processing device in a fourth embodiment.

FIG. 12 is a block diagram showing functions of an information processing device in the fourth embodiment. Each component in FIG. 12 that is the same as a component shown in FIG. 4 is assigned the same reference character as in FIG. 4. The information processing device 100*b* includes an acquisition unit 120*b*, a generation unit 130*b*, an evaluation unit 140*b*, a detection unit 150*b* and a display control unit 160*b*.

The functions of the acquisition unit 120*b*, the generation unit 130*b*, the evaluation unit 140*b*, the detection unit 150*b* and the display control unit 160*b* will be described later in detail.

Here, a process executed by the information processing device 100*b* will be described briefly by using a concrete example.

Figure 13:
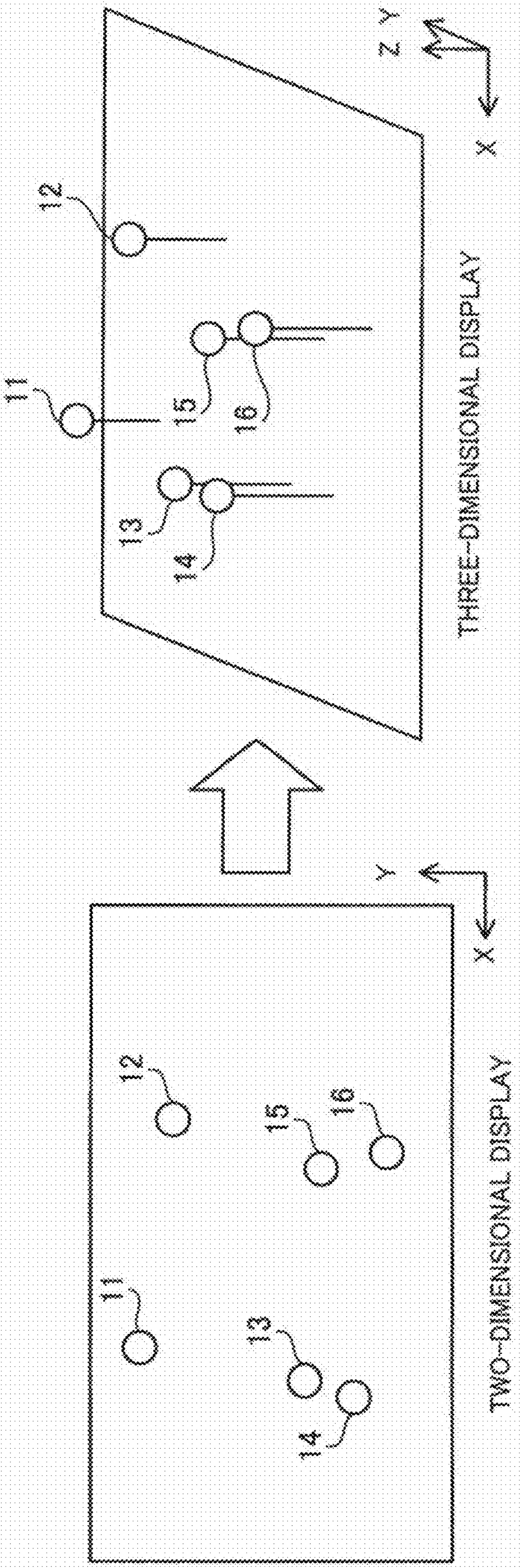
FIG. 13 is a diagram showing a concrete example of a display switching process in the fourth embodiment.

FIG. 13 is a diagram showing a concrete example of a display switching process in the fourth embodiment. The left part of FIG. 13 shows a state in which the aircraft 11 to 16 are displayed two-dimensionally by the display device 300. There are cases where the air traffic controller wants to switch the two-dimensional display to three-dimensional display. The air traffic controller gives a command to the information processing device 100*b* by using an input device (e.g., keyboard or the like). The information processing device 100*b* switches the two-dimensional display to the three-dimensional display based on the command. When making the display switching, the information processing device 100*b* uses a conventional technology. For example, when the coordinates of the aircraft 11 in the two-dimensional space is "(X1, Y1, 0)", the information processing device 100*b* adds a value greater than or equal to 1 to the Z-axis coordinate.

Here, when making the display switching, the information processing device 100*b* does not switch the two-dimensional display simply to the three-dimensional display. The information processing device 100*b* switches the two-dimensional display to the three-dimensional display so that the display is carried out in a state in which the overlap level of the aircraft is the lowest.

The right part of FIG. 13 shows a state in which the aircraft 11 to 16 are displayed in the three-dimensional display by the display device 300.

Next, a process executed by the information processing device 100*b* will be described below by using a flowchart.

Figure 14:
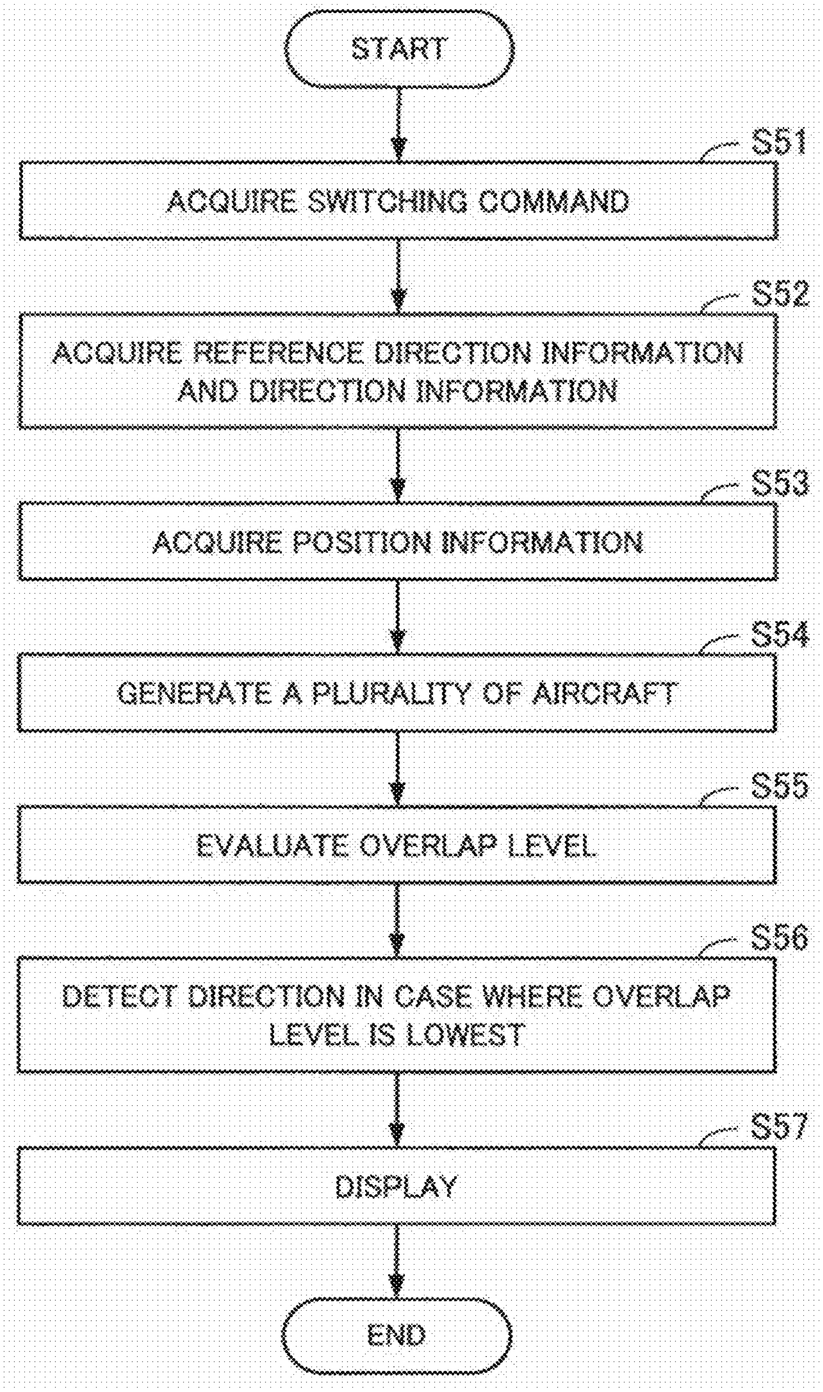
FIG. 14 is a flowchart showing an example of a process executed by the information processing device in the fourth embodiment.

FIG. 14 is a flowchart showing an example of the process executed by the information processing device in the fourth embodiment.

(Step S51) The acquisition unit 120*b* acquires a switching command from the two-dimensional display to the three-dimensional display. For example, the switching command is acquired by an input operation performed by the air traffic controller.

(Step S52) The acquisition unit 120*b* acquires the reference direction information and the direction information from the storage unit 110.

(Step S53) The acquisition unit 120*b* acquires position information, indicating the position of each of the plurality of aircraft represented two-dimensionally, from the storage unit 110. It is also possible for the acquisition unit 120*b* to acquire the position information from the external device.

(Step S54) The generation unit 130*b* generates the plurality of aircraft as viewed from the reference direction in the three-dimensional space based on the position information and the reference direction information.

(Step S55) The evaluation unit 140*b* evaluates the overlap level of the aircraft as viewed from the reference direction. Further, the evaluation unit 140*b* evaluates the overlap level of the aircraft as viewed from each of one or more directions different from the reference direction based on the direction information.

(Step S56) The detection unit 150*b* detects the direction in the case where the overlap level is the lowest.

(Step S57) The display control unit 160*b* makes the display device 300 display the plurality of aircraft as viewed from the detected direction.

By this process, the two-dimensional display is switched to the three-dimensional display. The overlap level of the aircraft displayed in the three-dimensional display is the lowest. Therefore, the recognition accuracy of the air traffic controller increases. Accordingly, the information processing device 100*b* is capable of increasing the recognition accuracy.

Incidentally, the processing order of the process in FIG. 14 is just an example. Thus, the process may also be executed in processing order different from that in FIG. 14.

According to the fourth embodiment, the information processing device 100*b* is capable of increasing the recognition accuracy. Further, when the two-dimensional display is switched simply to the three-dimensional display, for example, the air traffic controller makes an adjustment so that the aircraft do not overlap with each other. According to the fourth embodiment, the information processing device 100*b* automatically makes the adjustment so that the aircraft do not overlap with each other.

Therefore, the information processing device 100*b* is capable of reducing the load on the air traffic controller.

First Modification of Fourth Embodiment

A first modification of the fourth embodiment can be regarded as a combination of the second embodiment and the fourth embodiment.

Figure 15:
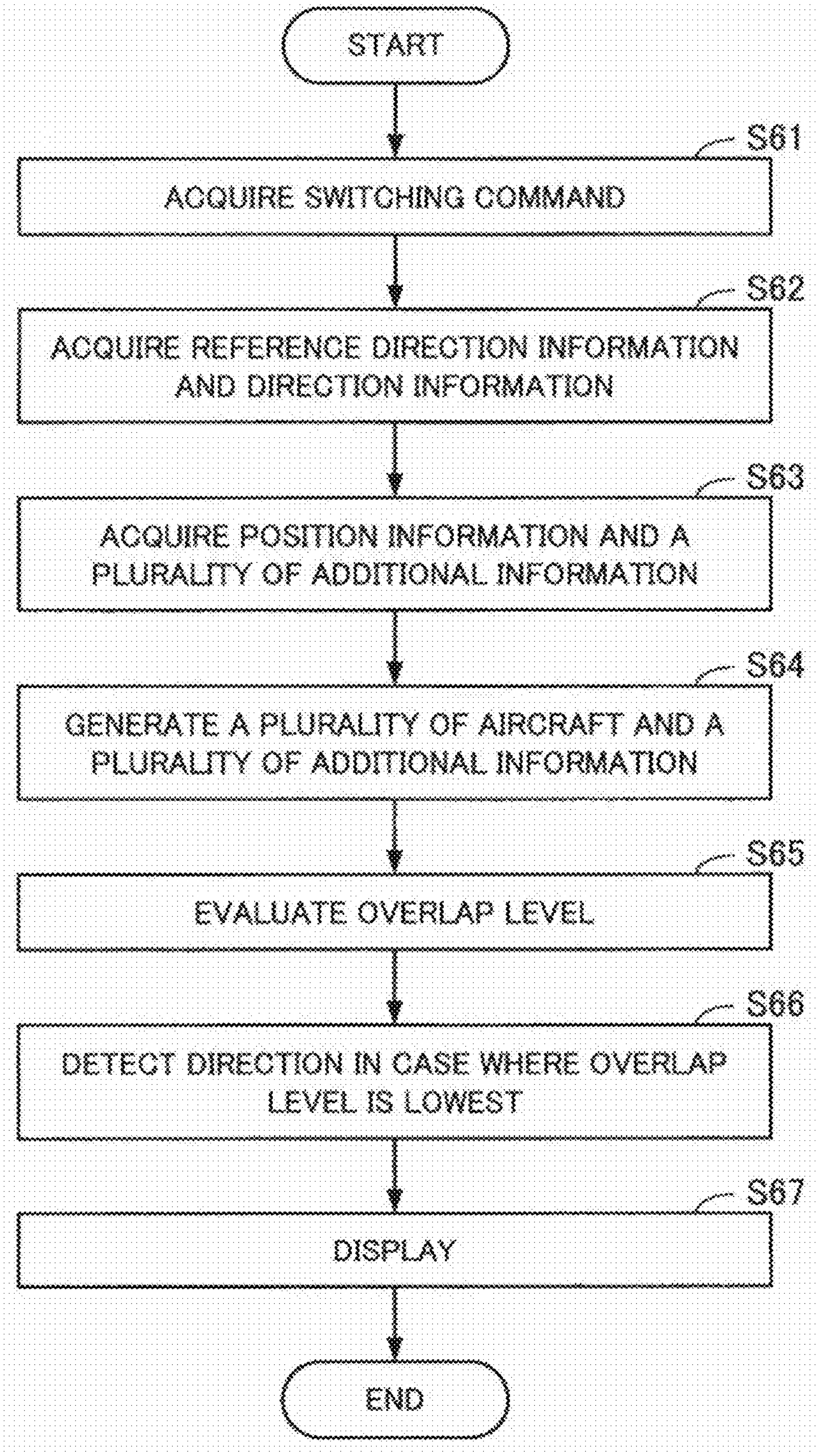
FIG. 15 is a flowchart showing an example of a process executed by an information processing device in a first modification of the fourth embodiment.

FIG. 15 is a flowchart showing an example of a process executed by an information processing device in the first modification of the fourth embodiment.

(Step S61) The acquisition unit 120*b* acquires the switching command from the two-dimensional display to the three-dimensional display.

(Step S62) The acquisition unit 120*b* acquires the reference direction information and the direction information from the storage unit 110.

(Step S63) The acquisition unit 120*b* acquires the position information, indicating the position of each of the plurality of aircraft represented two-dimensionally, from the storage unit 110. The acquisition unit 120*b* acquires the plurality of additional information from the storage unit 110.

(Step S64) The generation unit 130*b* generates the plurality of aircraft and the plurality of additional information as viewed from the reference direction in the three-dimensional space based on the position information and the reference direction information.

(Step S65) The evaluation unit 140*b* evaluates the overlap level as viewed from the reference direction. The overlap level means at least one of the level of overlap between an aircraft and an aircraft, the level of overlap between additional information and additional information, and the level of overlap between an aircraft and additional information.

Further, the evaluation unit 140*b* evaluates the overlap level as viewed from each of the one or more directions different from the reference direction based on the direction information. The overlap level means at least one of the level of overlap between an aircraft and an aircraft, the level of overlap between additional information and additional information, and the level of overlap between an aircraft and additional information.

(Step S66) The detection unit 150*b* detects the direction in the case where the overlap level is the lowest.

(Step S67) The display control unit 160*b* makes the display device 300 display the plurality of aircraft and the plurality of additional information as viewed from the detected direction.

By this process, the two-dimensional display is switched to the three-dimensional display. For example, the aircraft and the additional information represented three-dimensionally do not overlap with each other. Therefore, the recognition accuracy of the air traffic controller increases. Accordingly, the information processing device 100*b* is capable of increasing the recognition accuracy.

Incidentally, the processing order of the process in FIG. 15 is just an example. Thus, the process may also be executed in processing order different from that in FIG. 15.

Second Modification of Fourth Embodiment

A second modification of the fourth embodiment can be regarded as a combination of the third embodiment and the fourth embodiment.

Figure 16:
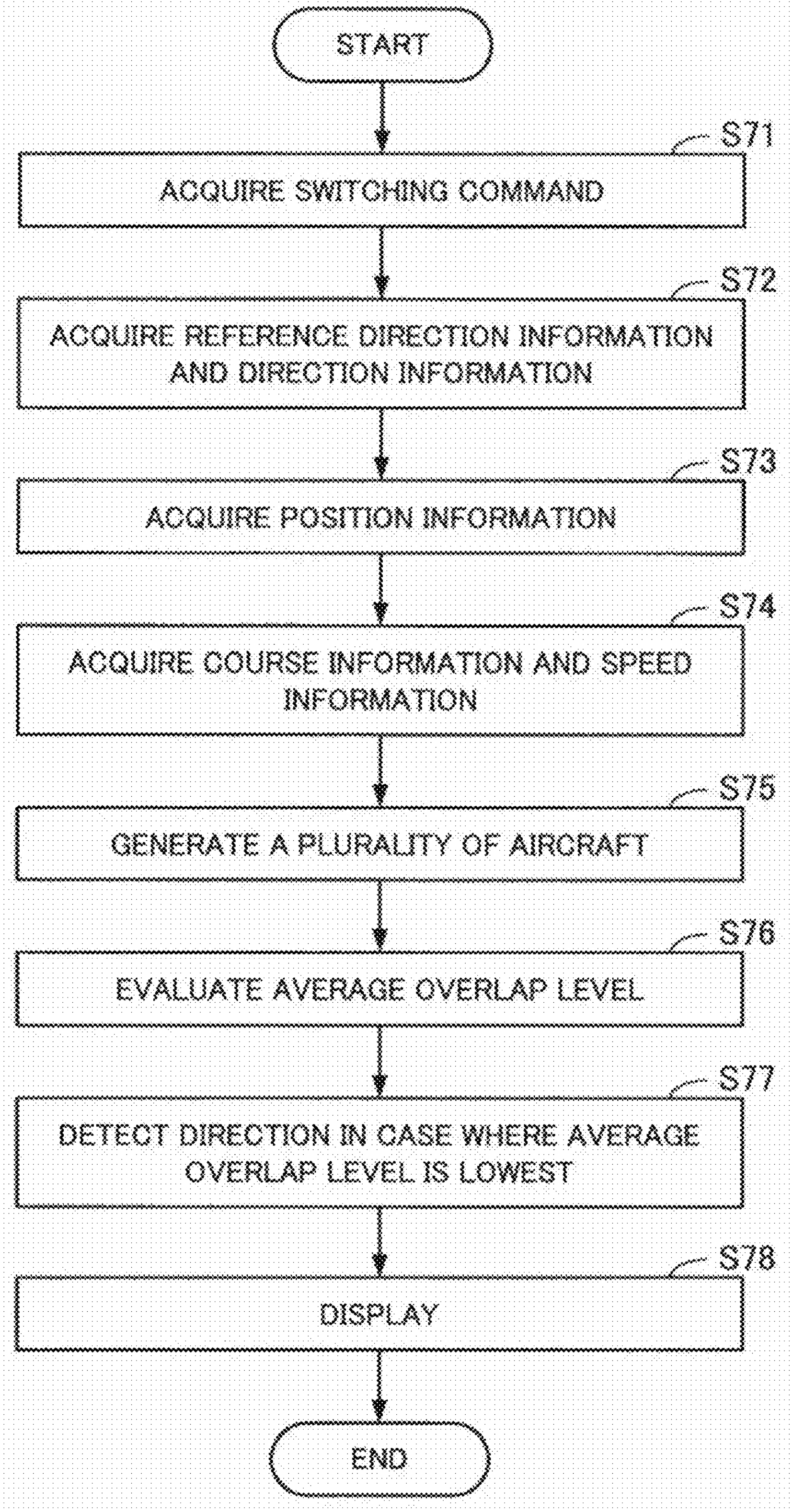
FIG. 16 is a flowchart showing an example of a process executed by an information processing device in a second modification of the fourth embodiment.

FIG. 16 is a flowchart showing an example of a process executed by an information processing device in the second modification of the fourth embodiment.

(Step S71) The acquisition unit 120*b* acquires the switching command from the two-dimensional display to the three-dimensional display.

(Step S72) The acquisition unit 120*b* acquires the reference direction information and the direction information from the storage unit 110.

(Step S73) The acquisition unit 120*b* acquires the position information, indicating the position of each of the plurality of aircraft represented two-dimensionally, from the storage unit 110.

(Step S74) The acquisition unit 120*b* acquires the course information from the management device 200. The acquisition unit 120*b* acquires the speed information from the management device 200. It is also possible for the acquisition unit 120*b* to acquire the course information and the speed information from the external device.

(Step S75) The generation unit 130*b* generates the plurality of aircraft as viewed from the reference direction in the three-dimensional space based on the position information and the reference direction information.

(Step S76) The evaluation unit 140*b* evaluates the average value of the overlap level of the aircraft as viewed from the reference direction in a predetermined period based on the course information and the speed information as the average overlap level.

Further, the evaluation unit 140*b* evaluates the average value of the overlap level of the aircraft as viewed from each of one or more directions different from the reference direction in the period based on the direction information, the course information and the speed information as the average overlap level.

(Step S77) The detection unit 150*b* detects the direction in the case where the average overlap level is the lowest.

(Step S78) The display control unit 160*b* makes the display device 300 display the plurality of aircraft as viewed from the detected direction. Further, the display control unit 160*b* executes the control so that the plurality of aircraft as viewed from the detected direction are displayed by the display device 300 for the period.

According to the second modification of the fourth embodiment, the information processing device 100*b* is capable of increasing the recognition accuracy from the present time point to the time point N seconds.

Third Modification of Fourth Embodiment

A third modification of the fourth embodiment can be regarded as a combination of the modification of the third embodiment and the fourth embodiment.

Figure 17:
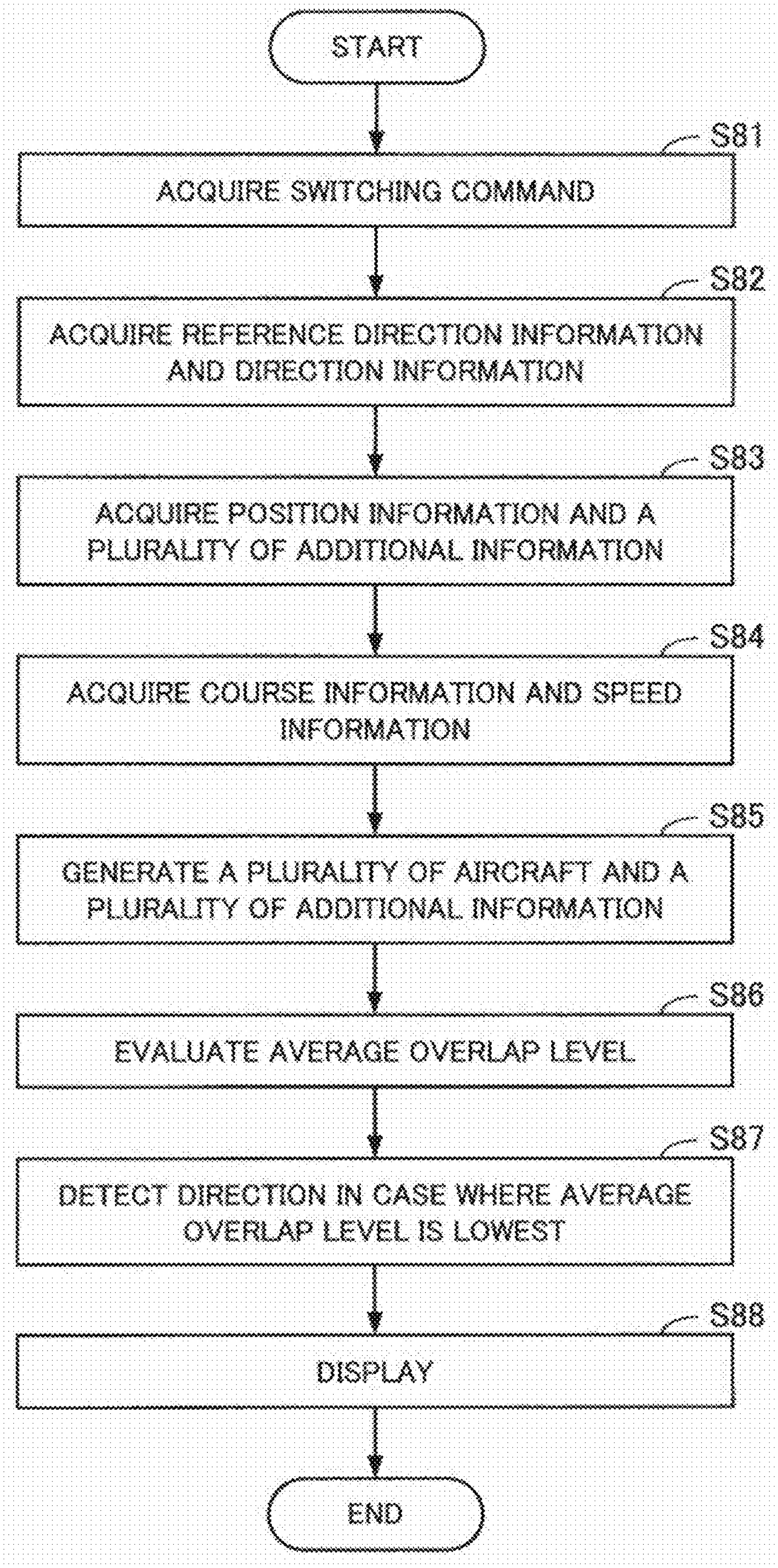
FIG. 17 is a flowchart showing an example of a process executed by an information processing device in a third modification of the fourth embodiment.

FIG. 17 is a flowchart showing an example of a process executed by an information processing device in the third modification of the fourth embodiment.

(Step S81) The acquisition unit 120*b* acquires the switching command from the two-dimensional display to the three-dimensional display.

(Step S82) The acquisition unit 120*b* acquires the reference direction information and the direction information from the storage unit 110.

(Step S83) The acquisition unit 120*b* acquires the position information, indicating the position of each of the plurality of aircraft represented two-dimensionally, from the storage unit 110. The acquisition unit 120*b* acquires the plurality of additional information from the storage unit 110.

(Step S84) The acquisition unit 120*b* acquires the course information from the management device 200. The acquisition unit 120*b* acquires the speed information from the management device 200. It is also possible for the acquisition unit 120*b* to acquire the course information and the speed information from the external device.

(Step S85) The generation unit 130*b* generates the plurality of aircraft and the plurality of additional information as viewed from the reference direction in the three-dimensional space based on the position information and the reference direction information.

(Step S86) The evaluation unit 140*b* evaluates the average value of the overlap level as viewed from the reference direction in a predetermined period based on the course information and the speed information as the average overlap level. The overlap level means at least one of the level of overlap between an aircraft and an aircraft, the level of overlap between additional information and additional information, and the level of overlap between an aircraft and additional information.

Further, the evaluation unit 140*b* evaluates the average value of the overlap level as viewed from each of one or more directions different from the reference direction in the period based on the direction information, the course information and the speed information as the average overlap level. The overlap level means at least one of the level of overlap between an aircraft and an aircraft, the level of overlap between additional information and additional information, and the level of overlap between an aircraft and additional information.

(Step S87) The detection unit 150*b* detects the direction in the case where the average overlap level is the lowest.

(Step S88) The display control unit 160*b* makes the display device 300 display the plurality of aircraft and the plurality of additional information as viewed from the detected direction. Further, the display control unit 160*b* executes the control so that the plurality of aircraft and the plurality of additional information as viewed from the detected direction are displayed by the display device 300 for the period.

According to the third modification of the fourth embodiment, the information processing device 100*b* is capable of increasing the recognition accuracy from the present time point to the time point N seconds.

Features in the embodiments described above can be appropriately combined with each other.

DESCRIPTION OF REFERENCE CHARACTERS

11-16: aircraft, 21-26: additional information, 100: information processing device, **100*a*: information processing device, 100*b*: information processing device, 101: processor, 102: volatile storage device, 103: nonvolatile storage device, 110: storage unit, 120: acquisition unit, 120*a*: acquisition unit, 120*b*: acquisition unit, 130: generation unit, 130*b*: generation unit, 140: evaluation unit, 140*a*: evaluation unit, 140*b*: evaluation unit, 150: detection unit, 150*a*: detection unit, 150*b*: detection unit, 160: display control unit, 160*a*: display control unit, 160*b*: display control unit, 200: management device, 300**: display device

What is claimed is:

1. An information processing device that makes a display device display information, the information processing device comprising:

acquiring circuitry to acquire position information indicating a position of each of a plurality of aircraft, reference direction information indicating a reference direction for viewing the plurality of aircraft in a three-dimensional space on the display device, direction information indicating one or more directions different from the reference direction for viewing the plurality of aircraft in the three-dimensional space on the display device, course information indicating a course of each of the plurality of aircraft, and speed information indicating speed of each of the plurality of aircraft;

generating circuitry to generate the plurality of aircraft as viewed from the reference direction in the three-dimensional space based on the position information and the reference direction information;

evaluating circuitry to evaluate an average value of an overlap level between the plurality of aircraft as viewed from the reference direction in a first predetermined period based on the course information and the speed information as a first average overlap level and evaluate an average value of the overlap level between the plurality of aircraft as viewed from each of the one or more directions different from the reference direction in the first predetermined period based on the direction information, the course information and the speed information as second average overlap levels;

detecting circuitry to detect a direction in a case where the average overlap level is lowest among the first average overlap level as viewed from the reference direction and the second average overlap levels as viewed from the one or more directions different from the reference direction; and display controlling circuitry to execute control so that the plurality of aircraft as viewed from the detected direction are displayed by the display device.

2. The information processing device according to claim 1, wherein the acquiring circuitry acquires a plurality of additional information corresponding to the plurality of aircraft, the generating circuitry generates the plurality of aircraft and the plurality of additional information as viewed from the reference direction in the three-dimensional space based on the position information and the reference direction information, the evaluating circuitry evaluates the average value of the overlap level as viewed from the reference direction in a second predetermined period based on the course information and the speed information as a third average overlap level and evaluates the average value of the overlap level as viewed from each of the one or more directions different from the reference direction in the second predetermined period based on the direction information, the course information and the speed information as fourth average overlap levels, the detecting circuitry detects a direction in a case where the average overlap level is lowest among the third average overlap level as viewed from the reference direction and the fourth average overlap levels as viewed from the one or more directions different from the reference direction, and the display controlling circuitry executes control so that the plurality of aircraft and the plurality of additional information as viewed from the detected direction are displayed by the display device.

3. The information processing device according to claim 1, wherein the position information indicates the position of each of the plurality of aircraft represented two-dimensionally, and the acquiring circuitry acquires a switching command from two-dimensional display to three-dimensional display.

4. A display method performed by an information processing device that makes a display device display information, the display method comprising:

acquiring position information indicating a position of each of a plurality of aircraft, reference direction information indicating a reference direction for viewing the plurality of aircraft in a three-dimensional space on the display device, direction information indicating one or more directions different from the reference direction for viewing the plurality of aircraft in the three-dimensional space on the display device, course information indicating a course of each of the plurality of aircraft, and speed information indicating speed of each of the plurality of aircraft and generating the plurality of aircraft as viewed from the reference direction in the three-dimensional space based on the position information and the reference direction information;

evaluating an average value of an overlap level between the plurality of the aircraft as viewed from the reference direction in a first predetermined period based on the course information and the speed information as a first average overlap level and evaluating an average value of the overlap level between the plurality of aircraft as viewed from each of the one or more directions different from the reference direction in the first predetermined period based on the direction information, the course information and the speed information as second average overlap levels;

detecting a direction in a case where the average overlap level is lowest among the first average overlap level as viewed from the reference direction and the second average overlap levels as viewed from the one or more directions different from the reference direction; and executing control so that the plurality of aircraft as viewed from the detected direction are displayed by the display device.

5. An information processing device that makes a display device display information, the information processing device comprising:

a processor to execute a program; and a memory to store the program which, when executed by the processor, performs processes of, acquiring position information indicating a position of each of a plurality of aircraft, reference direction information indicating a reference direction for viewing the plurality of aircraft in a three-dimensional space on the display device, direction information indicating one or more directions different from the reference direction for viewing the plurality of aircraft in the three-dimensional space on the display device, course information indicating a course of each of the plurality of aircraft, and speed information indicating speed of each of the plurality of aircraft and generating the plurality of aircraft as viewed from the reference direction in the three-dimensional space based on the position information and the reference direction information, evaluating an average value of an overlap level between the plurality of aircraft as viewed from the reference direction in a first predetermined period based on the course information and the speed information as a first average overlap level and evaluating an average value of the overlap level between the plurality of the aircraft as viewed from each of the one or more directions different from the reference direction in the first predetermined period based on the direction information, the course information and the speed information as second average overlap levels, detecting a direction in a case where the average overlap level is lowest among the first average overlap level as viewed from the reference direction and the second average overlap levels as viewed from the one or more directions different from the reference direction, and executing control so that the plurality of aircraft as viewed from the detected direction are displayed by the display device.

* * * * *